United States Patent
Lorenz

[15] 3,645,325
[45] Feb. 29, 1972

[54] AIR-CONDITIONING CONTROL SYSTEM FOR MINIMIZING OFFSET AND ZONE TEMPERATURE OSCILLATIONS

[72] Inventor: Jerome L. Lorenz, Columbus, Ohio
[73] Assignee: Ranco Incorporated, Columbus, Ohio
[22] Filed: Sept. 23, 1970
[21] Appl. No.: 74,305

[52] U.S. Cl. ..................................165/27, 165/14, 165/22, 62/160
[51] Int. Cl. .......................................................F25b 29/00
[58] Field of Search ..........................165/27, 22, 14; 62/160

[56] References Cited

UNITED STATES PATENTS

| | | | |
|---|---|---|---|
| 2,155,256 | 4/1939 | Crogo | 165/27 |
| 2,218,468 | 10/1940 | Haines | 165/22 |
| 2,372,839 | 4/1945 | McGrath | 165/22 |
| 3,512,579 | 5/1970 | Muskorac | 165/26 |
| 3,567,115 | 12/1970 | Nelson | 165/22 |

*Primary Examiner*—William J. Wye
*Attorney*—Watts, Hoffmann, Fisher & Heinke

[57] ABSTRACT

An air-conditioning system for a zone is disclosed which includes air-heating and air-cooling apparatus which are cycled for heating or cooling air moving to the zone through a duct. Cycling of the apparatus is governed by a temperature control system including a zone air temperature sensor and a duct air temperature sensor. The duct sensor has a relatively large authority in affecting control of the air-conditioning apparatus when the heating or cooling load on the zone is light so that variations in the duct air temperatures alone can effect cycling of the apparatus without any appreciable variation in the zone air temperature from a set point temperature. The authority of the duct sensor diminishes substantially when the zone temperature is relatively remote from the set point so that the conditioning apparatus is not cycled according to the duct air temperature.

9 Claims, 4 Drawing Figures

PATENTED FEB 29 1972          3,645,325
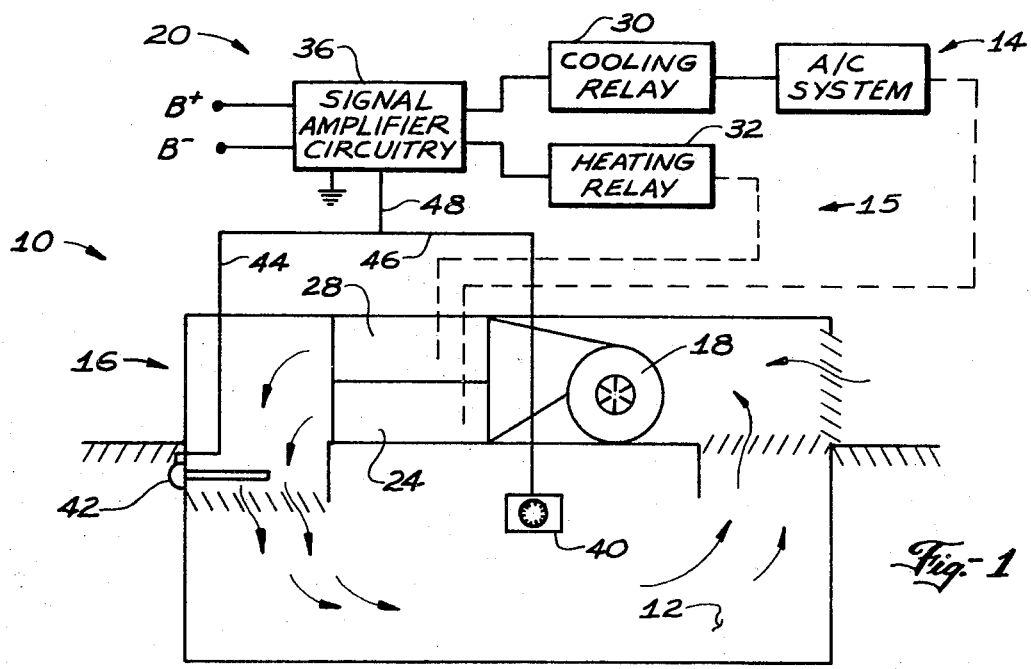
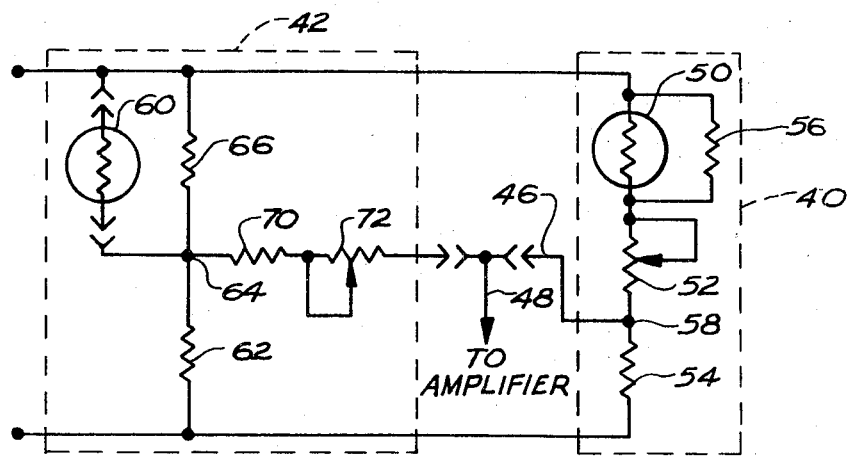
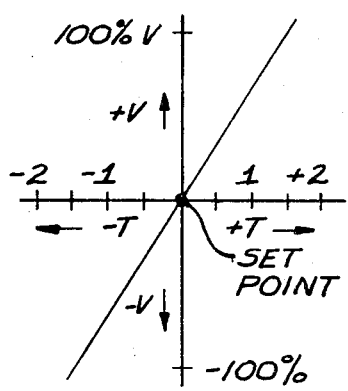
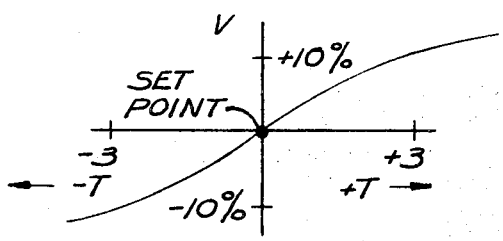
INVENTOR.
JEROME L. LOREN
BY Watts, Hoffmann,
Fisher & Heinke
ATTORNEYS

AIR-CONDITIONING CONTROL SYSTEM FOR MINIMIZING OFFSET AND ZONE TEMPERATURE OSCILLATIONS

BACKGROUND OF THE INVENTION

Field of the Invention

The present invention relates to control systems for air-conditioning systems and more particularly to control systems governing operation of relatively large capacity air-conditioning systems for heating or cooling air in a zone such as a building or a room in a building.

The Prior Art

Air-conditioning systems in which heated or cooled air is ducted into a zone have been in common use. In some systems, the cyclic operation of the air heating or air-cooling units was governed by control systems having sensors responsive to duct air temperature and zone air temperature. The temperature sensors produced mechanical or electrical signals to control on-off operation of the air-conditioning equipment.

In such systems the duct air temperature has been said to "lead" the zone air temperature, i.e., the duct air temperature was elevated or reduced before the temperature of the air in the zone was elevated or reduced respectively. The duct air sensor thus provided a "leading" control signal which was used to modify the affect of the zone sensor signal. Since the duct air temperature fluctuated over a wide range compared to the zone air temperature, the control system was arranged so that the duct air sensor had a significantly smaller authority in operating the equipment than did the zone sensor. For example, when the duct sensor detected a 1° F. duct air temperature change, the duct sensor signal was altered only slightly and therefore its authority over operation of the air-conditioning equipment was small. On the other hand when the zone air sensor detected a 1° F. temperature change, it produced a relatively large responsive signal having a relatively great authority over operation of the air-conditioning equipment.

It was recognized that large capacity air-conditioning equipment tended to cause unduly large oscillations in the zone air temperature when the zone was lightly loaded, i.e., when the zone temperature varied but slightly from the set point temperature. For this reason, the authority ratio between the duct and zone sensor signals has been maintained relatively low. For example, it was common for systems to employ authority ratios of about 20:1 where oscillations at light cooling loads were to be avoided. Thus, introduction of excessively high- or low-temperature air into the lightly loaded zone was avoided and the zone air temperature did not oscillate unduly when the load was light.

The requirement that low-authority ratios be used to prevent oscillation at light loads, however, resulted in substantial offsets, or thermostat "droop," when the zone was heavily loaded, i.e., when the temperature of the zone air varied widely from the set point temperature. Offset, or droop, usually occurred when the zone was heavily loaded and the thermostatic controls for the system prevented the set point temperature from being maintained. If, for example, the set point (and desired) zone temperature was 75°, offset or "droop" resulted in stabilization of the zone temperature at below 70° when the heating load on the zone was high. This was due to the relatively high authority duct sensors which cycled the heating equipment while the zone temperature remained below the set point. In order to increase the zone temperature to 75°, the set point temperature had to be increased to 85°, for example.

Offset also occurred where the zone was being cooled and the cooling load on the zone was high. In the case of cooling, the zone temperature usually stabilized well above the set point temperature.

The occurrence of offset, whether during heating or cooling, required that the zone set point temperature be frequently readjusted in order to produce a desired zone temperature level.

The prior art systems have generally employed a sensor authority ratio which was intermediate the optimum ratio for avoiding undue zone temperature oscillations at light zone loadings and an optimum ratio for avoiding excessive "droop."

SUMMARY OF THE INVENTION

The present invention provides a new and improved control for an air-conditioning system wherein the zone temperature oscillation is minimized when the load on the zone is light, yet offset, or thermostat droop, is minimized when the load on the zone is large.

In a preferred form of the invention, an air-conditioning system provides heated or cooled air to a zone via suitable ducting. The zone air temperature is determined by a control system which governs operation of the air-conditioning system.

The control system includes a zone air temperature sensor and a duct air temperature sensor. The zone air sensor produces a signal proportional to the difference between the zone air temperature and a preselected set point temperature. The duct sensor produces a signal proportional to the difference between the duct air temperature and the set point temperature. These signals are combined and processed by the control system which produces a command signal for controlling the air-conditioning system. Thus the operation of the air-conditioning system is governed by a command signal which is proportional to the combined signals from the duct and zone sensors.

The duct sensor and its associated circuitry generates a duct sensor signal which varies as a nonlinear function of sensed duct temperature. When the zone is relatively lightly loaded, i.e., when the zone temperature is close to the set point temperature, the air-conditioning equipment is controlled by the combined zone sensor and duct sensor signals which have an authority ratio of approximately 20:1. When the sensed zone air temperature varies from the set point temperature heating or cooling, as the case may be, is called for. Conditioned air is supplied to the zone through the duct and the temperature of the conditioned air discharged to the zone is sensed by the duct sensor.

Because the authority ratio between the zone sensor signal and the duct sensor signal is relatively small for light heating or cooling loads, the change in duct air temperature detected by the duct sensor produces a significantly changed duct sensor signal. This signal substantially effects the command signal tending to modulate or cycle the air-conditioning equipment. This occurs without requiring any significant change in the zone temperature signal. The zone temperature is thus prevented from oscillating substantially when the zone is lightly loaded and large capacity heating and/or cooling units are associated with it.

When the zone is relatively heavily loaded, the zone temperature tends to be substantially different from the set point temperature of the thermostat due to heat transfer to or from the zone. When this occurs, the new control system enables the air-conditioning equipment to supply sufficient heated or chilled air to the zone to return the zone air temperature to the set point level without requiring the zone thermostat to be reset in order to do so.

The new system provides a duct sensor signal which exhibits a small rate of change of magnitude with respect to sensed duct air temperature change when the zone is heavily loaded. In effect, the control system becomes insensitive to large duct air temperature deflections when the zone loads are large. This enables relatively hot, or relatively cold duct air to be introduced into the zone without cycling or modulating the air-conditioning equipment. Hence the air-conditioning equipment is primarily responsive to the sensed zone air temperature since the command signal more closely reflects sensed zone air temperature than duct air temperature.

Where the heating or cooling load on the zone is large and the zone air temperature is remote from the set point temperature, the authority ratio between the zone sensor signal and the duct sensor signal can be on the order of 40:1 or 50:1 or higher.

The new system is particularly effective for use in air-conditioning systems which employ electrical resistance heating elements to heat the duct air entering the zone. These heating elements have relatively small thermal inertias, so that heating the air in a given zone can be accurately controlled by the use of a sensor and control arrangement capable of rapidly cycling the heaters. Furthermore, then the heating loads on the zone are heavy, the heating elements can be operated for a significant period of time without frequent cycling caused by a duct and zone sensor arrangement in which a low-authority ratio between the zone sensor signal and the duct sensor signal is maintained.

A principal object of the present invention is the provision of a new and improved control system for an air conditioned zone wherein the authority ratio between a zone air temperature signal and a duct air temperature signal is relatively low when the heating or cooling load on the zone is light and which authority ratio increases markedly when the heating or cooling load on the zone increases thereby enabling a large capacity air-conditioning system to control a lightly loaded zone with minimal air temperature fluctuations in the zone, yet which enables the zone to be heated or cooled under large loads with minimal offset or thermostat droop.

Other objects and advantages of the present invention become apparent from the following detailed description made with reference to the accompanying drawings which form a part of the specification.

BRIEF DESCRIPTION OF THE DRAWINGS

FIG. 1 is a schematic view of an air-conditioning system embodying the present invention;

FIG. 2 is a diagrammatical view of circuitry forming a part of the system of FIG. 1; and FIGS. 3a and 3b are graphic representations of signals produced by a zone temperature sensor and a duct temperature sensor, respectively, utilized in the system of FIG. 1.

DETAILED DESCRIPTION OF A PREFERRED EMBODIMENT

An air-conditioning system 10 is illustrated in FIG. 1. The system 10 includes an air conditioned zone 12 which may be a room in a building and which zone is provided with a rooftop air-cooling apparatus 14 and a rooftop air-heating apparatus 15. Air is circulated through the zone 12 via ducting 16 which includes an air blower unit 18. The zone air temperature is modulated by a control system 20 which governs operation of the air-cooling apparatus 14 or the air-heating apparatus 15 depending on the nature of the heating or cooling load on the zone.

The air-cooling apparatus 14 includes a refrigeration unit having an air-cooling heat exchanger 24. The refrigeration unit can be a compressor-condenser-evaporator-type mechanical unit with the heat exchanger 24 being formed by the evaporator of the unit. The heat exchanger 24 is disposed in the ducting 16 so that duct air is directed across the heat exchanger 24 for cooling.

The air-heating apparatus 15 includes an air-heating heat exchanger 28 disposed in the ducting 16 so that the air circulating into the zone 12 is directed across it for heating. The heat exchanger 28 is preferably a series of banks of electrical resistance heated coils. These heaters may be of any suitable type and configuration and may be commercially available types, accordingly, the heating apparatus 15 and refrigeration apparatus 14 are not described in further detail.

The control system 20 operates the heating and cooling units in response to sensed duct air temperature and sensed zone air temperature. The system 20 operates the rooftop air-cooling apparatus 14 by a cooling relay unit 30. The rooftop air-heating apparatus 15 is operated by a heating relay unit 32. The relay units 30, 32 may be of any suitable construction and therefore are schematically shown.

The relay units 30, 32 are connected to the output circuit of a differential amplifier 36. The amplifier 36 provides a command signal to operate the relay units and is connected across positive, negative and neutral, or reference, terminals of a DC power supply. When the amplifier output voltage levels are positive with respect to the reference terminal, the cooling relay is operable. When the output voltage from the amplifier 36 is negative with respect to the reference voltage, the heating relay is operable.

The input signal for the amplifier 36 is provided by a zone sensor 40 and a duct sensor unit 42. The duct sensor produces an electrical signal which is a function of the difference between a sensed duct air temperature and a temperature set point for the zone. This signal is fed to the input of the amplifier 36 through a lead 44. The zone sensor detects air temperatures in the zone and produces an electrical signal which is fed to the amplifier through a lead 46. The signal produced by the zone sensor is a function of the difference between a detected zone air temperature and a zone air temperature set point.

The zone and duct sensor signals are combined algebraically to provide a composite signal to the amplifier 36. The composite signal is a function of the zone air temperature and duct air temperature. In the illustrated embodiment, the leads 44, 46 are both connected to an amplifier input lead 48. The amplifier 36 is a linear amplifier so that the command signal at the amplifier output is proportional to the composite input signal.

The amplifier input signal is varied more by the zone sensor than by the duct sensor. That is to say, the change in input signal level produced by the detection of a 1° F. temperature increase by the zone sensor is substantially larger than the change in input signal level produced by a detected 1° F. air temperature increase by the duct sensor.

In order to prevent oscillation of zone air temperature by a high-capacity air-conditioning system when the zone is lightly loaded, the authority ratio between the zone air signal and the duct air signal is relatively low. For example, the ratio between the change in amplifier input signal produced by one degree temperature change detected by the zone sensor and the change in input signal produced by a 1° temperature change sensed at the duct sensor is approximately 20:1.

At this authority ratio, the effect of the duct sensor on the amplifier output signal is relatively large and the heating or cooling apparatus is cycled in response to fluctuations in the temperature of the duct air rather than fluctuations in the zone air temperature. Thus the duct sensor can be said to provide a "leading" signal which causes stabilization of the zone temperature without substantial overshooting resulting from the thermal inertia of the zone and its contents.

The zone air temperature is thus stabilized at or about the set point temperature without marked oscillations in the zone air temperature since heating or cooling of the zone occurs cyclically and as determined by the temperature of the duct air.

Where the heating or cooling load on the zone is large, the sensed zone temperature is substantially different from the set point temperature. In these conditions it is essential that the authority ratio be relatively high so that adequate quantities of hot or cold air can be introduced into the zone through the duct. Put another way, when the heating or cooling load on a given zone is large, the effect of the duct sensor signal on the command signal should be minimized.

If the authority ratio between the zone air sensor signal and the ductor sensor signal were relatively low during periods of large loads on the zone, the air-conditioning equipment would be cycled in response to changes in duct air temperature. This would occur essentially independently of the sensed zone air temperature and the air-conditioning equipment will continue to cycle without balancing the load on the zone, i.e., the sensed zone temperature remains substantially different from the set point temperature. An occupant of the zone may be required to change the zone set point temperature to an artificially high or low level in order to maintain a desired temperature in the zone. This phenomenon is known as temperature offset or thermostat droop.

According to the present invention, the authority ratio between the zone sensor and the duct sensor varies depending on the difference between the zone temperature and the set point temperature. The zone and duct sensors have a relatively low-authority ratio when the heating or cooling load on the zone is small and a relatively high-authority ratio when the heating or cooling load on the zone is high.

FIG. 2 shows preferred electrical circuitry forming the zone and duct sensor circuits. The zone sensor 40 is formed by a thermally responsive voltage divider arrangement connected across the positive and negative power supply terminals. The voltage divider arrangement includes a zone temperature-sensing thermistor 50, a potentiometer 52 and a fixed resistor 54 connected in a series circuit across the power supply terminals. A linearizing resistor 56 is connected in parallel with the thermistor 50.

The output of the voltage divider circuit is transmitted to the amplifier 36 via a junction 58, the lead 46 and the amplifier input lead 48. The zone sensor circuitry provides a substantially linear voltage response to temperature changes throughout the range of predictable zone temperatures. The slider of the potentiometer 52 is mechanically linked to a temperature setting knob or dial of the zone sensor unit 40 so that manual setting of the resistance of the potentiometer 52 determines the zone set point temperature. The knob is not shown.

The circuitry for the duct sensor 42 includes a thermistor 60 connected in series with a fixed resistor 62 via an output junction 64. A resistor 66 connected in parallel with the thermistor 60 has a resistance value selected to linearize the resistance of the thermistor 60 over a predetermined temperature range. The output voltage from the duct sensor is transmitted to the amplifier input through a resistor 70 and a potentiometer 72.

The potentiometer 72 is adjustable to control the authority ratio between the duct sensor and room sensor circuitry at a given level. When the thermistor 60 and the thermistor 50 both sense air at 75° F. the potentiometer is adjusted so that the signal produced by the zone sensor circuitry is approximately twenty times the magnitude of the signal produced by the duct sensor circuitry. This adjustment is preferably made during installation of the system.

The output signal from the amplifier 36 attributable solely to the zone sensor circuitry is substantially a linear function of sensed zone air temperature extending throughout the range of amplifier output voltages. FIG. 3a shows the amplifier output voltage curve due solely to the sensed zone air temperature. In a preferred embodiment of the invention, the amplifier produces a 100 percent positive output voltage at a zone temperature 1½° above the set point level and a negative 100 percent amplifier output voltage when the zone temperature is about 1½° below the set point temperature.

The duct sensor circuitry illustrated in FIG. 2 enables the authority ratio between the zone sensor and the duct sensor to increase markedly when the zone temperature differs substantially from the set point temperature, i.e., when the load on the zone is great. This function of the duct sensor circuit is illustrated in FIG. 3b wherein the amplifier output voltage is shown solely as a function of sensed duct air temperature. The plot of the output voltage attributable to signals from the duct sensor is a nonlinear curve having a linear, or substantially linear, portion extending through the set point. This curve exhibits a relatively small rate of change of voltage with respect to sensed duct air temperature at duct air temperatures which are substantially higher or substantially lower than the set point temperature.

The duct sensor circuitry thus prevents thermostat droop as well as zone temperature oscillations at light loads. As an example of this function, assume that a light cooling load is applied to a zone cooled by a high-capacity cooling system. The light cooling load can result in the zone air temperature rising to 1° F. above the set point temperature. The zone sensor circuitry detects this zone air temperature and consequently a positive amplifier output or command voltage of about 30 percent of peak is generated.

The cooling apparatus is operated in response to this amplifier output voltage resulting in a forced flow of chilled duct air being circulated in the zone. The chilled air in the duct is substantially cooler than the set point temperature so that the duct air sensor produces a corresponding signal. If, for example, the duct air temperature is reduced to 10° F. below the set point temperature the signal produced by the sensed duct air temperature reduces the amplifier output voltage negatively towards the reference level. The reduced command voltage level turns off the cooling equipment without substantially depressing the zone temperature.

The duct air temperature then rises toward the set point temperature and the cooling apparatus is cycled on again, unless the zone air temperature has been reduced to nearly the set point level. Cycling of the refrigeration apparatus continues under the control of the duct air sensor until the zone temperature is sufficiently close to the set point temperature that the cooling equipment can no longer be cycled.

On the other hand, if the cooling load on the zone is extremely high the sensed zone temperature is likely to be at least 3° F. above the set point temperature. This produces an amplifier output voltage of 100 percent of the peak value. When this occurs, the cooling apparatus is operated by the amplifier and cooling relay to supply chilled air to the zone.

As chilled air is supplied to the zone, the duct sensor produces an amplifier input signal which is of a negative sense and which tends to diminish the input signal to the amplifier. As the duct air temperature continues to decrease, the duct sensor begins to respond nonlinearly to changes in the sensed duct air temperature. When this occurs the rate of change of the duct temperature signal with respect to sensed duct air temperature is reduced to a relatively low level. The effect of the duct air sensor on the amplifier output voltage is thus reduced as the duct air temperature decreases and the zone air temperature remains high relative to the set point temperature. The reduced sensitivity of the duct sensor to duct air temperatures remote from the set point temperature raises the authority ratio of the zone sensor to the duct air sensor markedly when the load on the zone increases. As a result the refrigeration unit can no longer be cycled in response to sensed duct air temperature as the signal produced by the duct air sensor is not sufficient to overcome the effect of the signal produced by the zone sensor. Accordingly, the unit runs continuously until the zone temperature has been reduced to a level at which the combined duct air temperature signal and zone air temperature signal cause cycling or modulation of the refrigeration unit.

The variable authority ratio is also effective when the zone is heated. When large differences between the set point temperature and the zone temperature exist the authority ratio is increased significantly. The duct sensor tends to cycle the heating apparatus less frequently, enables higher duct air temperatures to exist and therefore permits the zone air temperature to approach the set point temperature rather closely.

From the foregoing description it can now be seen that a new and improved air-conditioning system for a zone has been provided in which the authority ratio between a zone sensor unit and a duct sensor unit is variable to eliminate temperature oscillation in the zone at light loads and to prevent offset, or thermostat droop, when the loads on the zone are high.

While only a single embodiment of the invention has been illustrated and described herein in considerable detail the present invention is not to be considered limited to the precise construction shown. One electrical system for producing a variable authority ratio is disclosed; however, others could be devised. For example, a mechanical thermostatic element, such as a bellows, could be connected to a variable impedance element to produce a nonlinear duct temperature signal for producing the variable authority ratio. It is intended to cover hereby all adaptations, modifications and uses of the invention which come within the scope of the appended claims.

What is claimed is:

1. In a system for air conditioning a zone having air heating means for heating air circulating to the zone and air cooling means for cooling air circulating to said zone, a control system governing operation of said heating and cooling means in response to sensed temperature comprising:
   a. a first air temperature sensor unit for sensing variations in zone air temperature relative to a set point temperature and producing a signal which is a function of said sensed variations;
   b. a second air temperature sensor unit for sensing the temperature of air discharged into said zone and producing a second signal which varies as a function of the temperature of the air discharged into said zone;
   c. control means for said heating and cooling means, said control means connected to said first and second sensor units whereby said first and second signals are combined to govern operation of said control means according to the air temperatures sensed by said sensor units;
   d. said second sensor unit including temperature responsive circuitry having elements for producing a relatively large rate of change of magnitude of said second signal with respect to sensed temperature change when said discharge temperatures are close to the zone set point temperature and a relatively small rate of change of magnitude with respect to sensed temperature change when said discharge air temperatures are remote from said set point temperature.

2. A system as claimed in claim 1 wherein the ratio of authority of said first sensor signal to the authority of said second sensor signal increases as the heating or cooling load on said zone increases.

3. A system as claimed in claim 2 wherein said authority ratio is about 20:1 when the heating or cooling load on said zone is minimal and increases to at least about 40:1 when the heating or cooling load on said zone increases.

4. A system as claimed in claim 1 wherein said first sensor unit comprises an electrical resistance element having a resistance which varies according to the temperature of said element, said element connected in sensor circuitry which produces a substantially linear signal in response to zone air temperature changes within a predetermined range detected at said resistance element.

5. A system as claimed in claim 4 wherein said circuit elements of said second sensor unit include a second temperature responsive resistance element characterized by having a resistance which varies in response to discharge air temperature changes, said second resistance element associated with circuitry for producing a substantially linear signal in response to discharge air temperature changes within a predetermined range extending above and below the set point temperature and nonlinear signals when said discharge air temperatures are beyond said range.

6. In an air-conditioning system for comfort conditioning air circulated to a zone, a control system comprising:
   a. control means governing operation of said system in response to sensed air temperatures;
   b. air temperature sensor means cooperatively related to said control means;
   c. said sensor means comprising:
      1. a zone air sensor device producing a zone air temperature signal which is a function of the difference between sensed zone air temperature and a set point temperature;
      2. a discharge air sensor device producing a temperature signal which is a function of the difference between the temperature of air discharged to said zone and said set point temperature;
      3. structure for combining said zone air temperature signal with said discharge air temperature signal whereby said control means responds to said combined signals; and
   d. said discharge air sensor device including means providing for a first relatively large authority of said discharge air temperature signal when said zone temperature is substantially at said set point temperature and a second smaller authority when said zone temperature is substantially different from said set point temperature, said air conditioning system controlled primarily by said discharge air temperature signal when said authority is relatively large and controlled primarily by said zone air temperature signal when said authority is smaller.

7. A system as claimed in claim 6 wherein the ratio of the authority of said zone air temperature signal to said discharge air temperature signal is about 20:1 when said zone air temperature is at said set point temperature, said authority ratio increasing to at least 40:1 as said zone air temperature varies from said set point temperature.

8. In a control system for an air conditioned zone:
   a. air-conditioning apparatus;
   b. control means for said air-conditioning apparatus;
   c. a zone air temperature sensor;
   d. a discharge air temperature sensor;
   e. means for establishing a set point temperature;
   f. one of said sensors including means for changing the authority thereof as the zone air temperature varies from said set point temperature whereby the ratio of the authority of said zone sensor to said discharge sensor varies from about 20:1 when said set point temperature and zone temperature are substantially the same to at least 40:1 when said zone temperature is substantially different from said set point temperature.

9. A system as claimed in claim 8 wherein the authority of said discharge sensor is reduced as the difference between said zone air temperature and said set point temperature increases.

* * * * *